United States Patent [19]

Herzik et al.

[11] 4,456,969
[45] Jun. 26, 1984

[54] SYSTEM FOR AUTOMATICALLY HYPHENATING AND VERIFYING THE SPELLING OF WORDS IN A MULTI-LINGUAL DOCUMENT

[75] Inventors: Aubrey M. Herzik; Sharon S. Hobbs, both of Austin; James T. Repass, Round Rock, all of Tex.

[73] Assignee: International Business Machines Corporation, Armonk, N.Y.

[21] Appl. No.: 310,181

[22] Filed: Oct. 9, 1981

[51] Int. Cl.³ .................... G06F 7/28; G06F 15/02; G06F 15/40; G06K 9/00
[52] U.S. Cl. .................... 364/900; 364/419; 369/83
[58] Field of Search ... 364/200 MS File, 900 MS File, 364/ 419; 340/146, 3 WD, 146.3 ED, 347 DD, 715; 178/69 G, 23 A; 235/310; 369/83

[56] References Cited

U.S. PATENT DOCUMENTS

| | | | |
|---|---|---|---|
| 3,439,341 | 4/1969 | Dolby et al. | 340/146.3 ED |
| 3,537,076 | 10/1970 | Damerau | 340/146.3 ED |
| 3,618,032 | 11/1971 | Goldsberry | 340/146.3 ED |
| 3,815,104 | 6/1974 | Goldman | 364/200 |
| 3,995,254 | 11/1976 | Rosenbaum | 340/146.3 WD |
| 4,010,445 | 3/1977 | Hoshino | 340/146.3 WD |
| 4,028,677 | 6/1977 | Rosenbaum | 340/146.3 ED |
| 4,092,729 | 5/1978 | Rosenbaum et al. | 364/900 |
| 4,158,236 | 6/1979 | Levy | 364/900 |
| 4,244,031 | 1/1981 | Izushima et al. | 364/900 |
| 4,328,561 | 5/1982 | Convis et al. | 364/900 |

Primary Examiner—Charles E. Atkinson
Assistant Examiner—William G. Niessen
Attorney, Agent, or Firm—John W. Henderson, Jr.

[57] ABSTRACT

Disclosed is an improved system for verifying the spelling and providing hyphenation points for text words from a plurality of interspersed languages. The control system includes control codes which are inserted in the text to define the language of the text following the control code. The system accepts the control codes and responds by comparing the text following the control code against a storage dictionary of correctly spelled words and hyphenation points for the language associated with the control code. The system provides as an output an indicator of whether the word is correctly spelled or where the proper hyphenation points for the word appears. The systemn further includes control codes which when detected will cause blocks of data which should not be compared to the storage dictionary to be skipped.

8 Claims, 9 Drawing Figures

```
                    INSTRUCTIONS
           ID    ITEM
           A     BEGIN KEEP
           B     END KEEP
           C     INCLUDE

D     FILE-REPORT DEFINITION
           E     MULTI-COLUMN HEADING
           F     RECORD-GROUP COMPUTATIONS
           G     CONDITIONAL TEXT

H     ARITHMETIC

I     BEGIN SPELLING CHECK
           J     END SPELLING CHECK
           K     LANGUAGE FOR SPELLING CHECK

WHEN FINISHED WITH THIS MENU, PRESS ENTER.

TYPE ID LETTER TO CHOOSE ITEM;   PRESS ENTER: #
```

FIG. 7

```
LANGUAGE FOR SPELLING CHECK INSTRUCTION
     ID   LANGUAGE

A    U. S. ENGLISH
     B    U. K. ENGLISH
     C    GERMAN
     D    DUTCH
     E    NATIONAL FRENCH
     F    CANADIAN FRENCH
     G    ITALIAN
     H    SPANISH
     I    SWEDISH
     J    FINNISH
     K    DANISH
     L    NORWEGIAN

TYPE ID LETTER TO CHOOSE ITEM; PRESS ENTER: #
```

SYSTEM FOR AUTOMATICALLY HYPHENATING AND VERIFYING THE SPELLING OF WORDS IN A MULTI-LINGUAL DOCUMENT

DESCRIPTION

1. Technical Field

This invention relates generally to text processing systems and, more particularly to methods and means in a text processing system for automatically checking the spelling and/or hyphenating text words from a plurality of languages.

2. Background Art

Prior art text processing systems which include functions for verifying whether input words are spelled correctly and functions for providing hyphenation points for words typically include a permanent storage dictionary of high usage words in the primary language of the country where the text processing system will be used. For example, text processing systems sold in the U.S. would include U.S. English words, systems sold in France would include French words, systems in Germany would include German words, etc. These prior art systems sometimes include an additional temporary storage dictionary which is usually filled by the user with words that are peculiar to the user's business, for example, customer names and addresses, legal words, medical words, etc.

As societies have become more and more multilingual it has become common to produce documents that include words from more than one language. In many instances the documents include translations from one language to another, for example, English and Spanish in the U.S. and English and French in Canada. These translations may take the form of interspersed paragraphs or columns. Documents of this kind make it impractical to use prior art spelling verification and automatic hyphenation functions because of the large numbers of words from the second language that would not be found in the storage dictionary. This has caused either non-use of the spelling verification and automatic hyphenation functions or a multi-step operation where the primary language part of the document is prepared separately and then merged with the text of the translation.

SUMMARY OF THE INVENTION

The present invention discloses control means and methods in a text processing system for automatically checking the spelling and providing hyphenation points for interspersed text words from a plurality of languages. The control system includes control codes which are inserted in the text to define the language of the following text. The control codes are generated automatically for a default primary language or the operator is provided the means to select control codes defining a plurality of optional languages. The system accepts the control codes and responds by checking the text following the control code against the storage dictionary for the language associated with the control code. Additionally, the operator has the option to skip blocks of data such as numerical tables which are not language specific.

DESCRIPTION OF THE PREFERRED EMBODIMENT

The invention will now be described as embodied in an interactive information processing system of the type shown in FIG. 1. The information processing system of FIG. 1 comprises a terminal 1 connected to a diskette storage unit 16. Terminal 1 has a display screen 14 and a keyboard 10. Through operation of the keyboard 10 an operator can enter commands to terminal 1 to cause information to be transferred between terminal 1 and the diskette storage device 16. The operator can further enter alphanumeric characters and commands for control of the display on screen 14.

Figure 1:
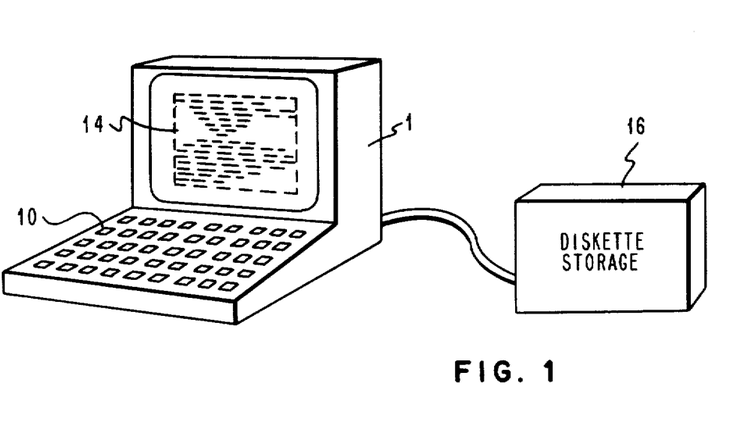
FIG. 1 is a perspective view of an information processing system comprising a terminal and a storage unit.
Figure 2:
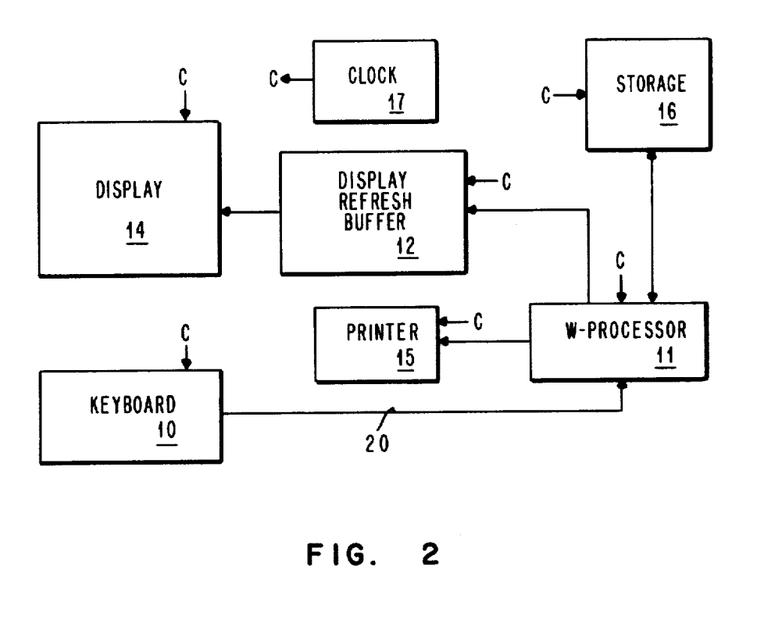
FIG. 2 is a block diagram of the information processing system of FIG. 1.

FIG. 2 shows a more detailed illustration of the information processing system of FIG. 1 in block diagram form. As further illustrated in FIG. 2, the information processing system comprises a keyboard 10, microprocessor 11, a display refresh buffer 12, a display device 14, and an auxiliary direct access storage device 16 such as a diskette drive. Additionally, a printer 15 is shown connected to the processor 11 for providing hard copy output and a clock 17 for keeping the various components of the system in synchronism is shown effectively coupled to each of the units.

Keyboard 10 comprises a normal set of graphic symbol keys such as letters, numbers, punctuation marks, and special character keys, plus text format or control keys like carriage return, tab, index, etc. In addition, the keyboard 10 includes a second set of control keys for issuing special control commands to the system. The control keys include cursor movement keys, keys for setting the keyboard into a number of different modes, etc.

Figure 3:
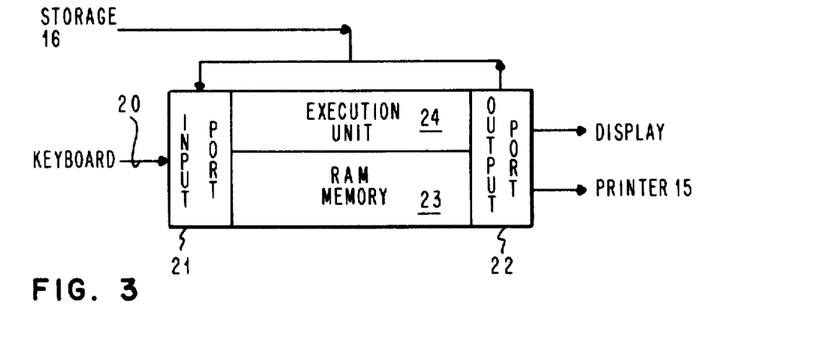
FIG. 3 is a functional diagram of the microprocessor shown in FIG. 2.

Keyboard 10 is connected to the microprocessor 11 by means of a bus 20. The microprocessor 11 as shown in FIG. 3 comprises an input port 21, an output port 22, a random access memory 23, and a process execution unit 24.

Figure 4:
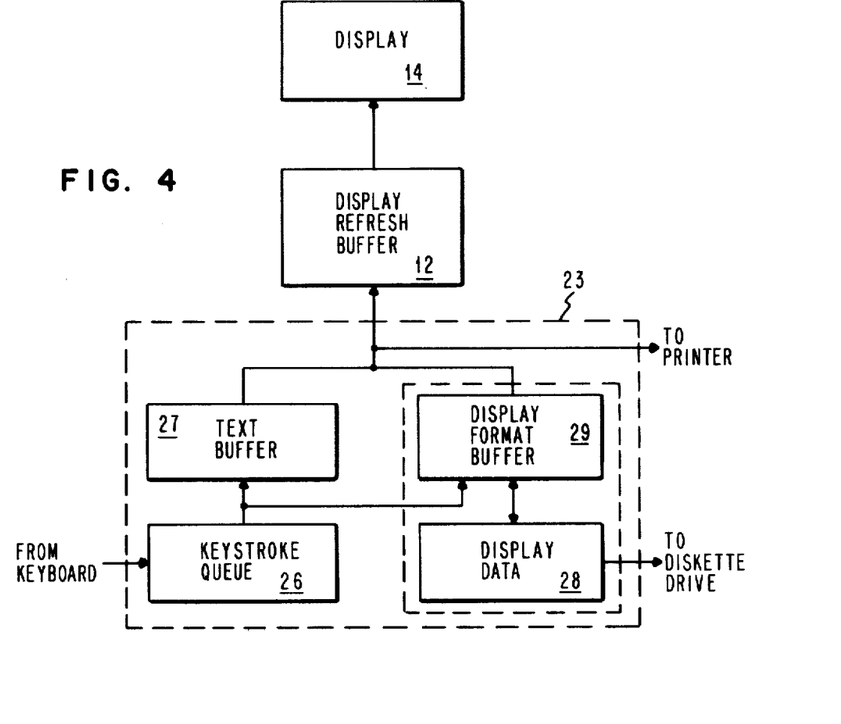
FIG. 4 is a functional diagram illustrating the data flow path between portions of the memory and a microprocessor and the display refresh buffer.

Functionally, memory unit 23 stores both instructions and data. Instructions and data are entered into memory 23 from the keyboard 10 as bytes of binary information through input port 21. As shown in FIG. 4, the section of the RAM 23 which receives the keystroke data from the keyboard 10 is designated keystroke queue 26. Data to be displayed in transferred by a series of instructions from queue 26 to the text buffer section 27 and then to the display refresh buffer 12 through the output port 22 of the microprocessor 11. This is achieved in a conventional way by the microprocessor 11 executing a series of move instructions.

The microprocessor 11 may be an IBM Series 1, Intel Model 8086, or any other recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the electron beam as it traces a series of horizontal lines across the screen.

The output port 22 also supplies data stored in memory 23 to the printer 15 and disk storage unit 16, each of which may have their own internal buffers which are not shown. Commands to transfer data from the random access memory 23 to the printer 15 or storage unit 16 are sent to the microprocessor 11 by the operator from the keyboard 10.

Printer 15 may be any suitable printer known in the art. In most text processing systems, the printer 15 is basically a standard input/output terminal printer having a type ball print element or a daisy-wheel print element.

Disk storage 16 may also be any suitable disk storage device which is capable of storing serial byte data supplied to it at determined sector address locations, each of which are randomly addressable by the microprocessor 11 to retrieve the data. Spatially related data supplied from disk drive 16 is stored in the display data area 28 of the memory 23 is encoded form. The other section of memory 23 shown in FIG. 4 is the display format buffer area 29 which is involved in the handling of spatially related data in decoded form in accordance with the present invention.

Figure 5:
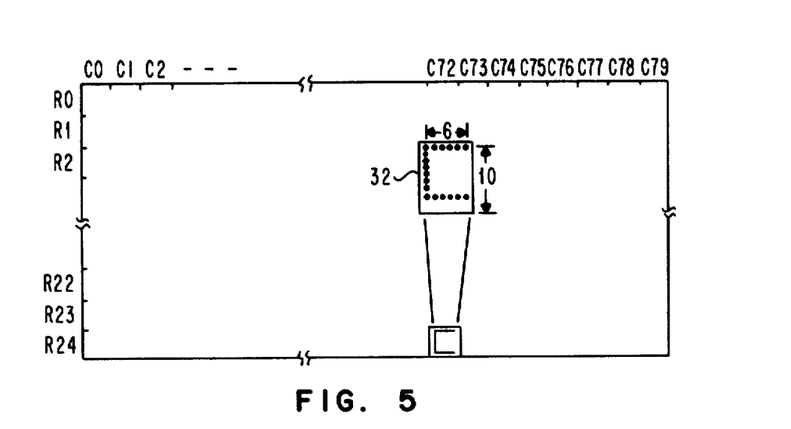
FIG. 5 is a diagrammatic view of the display shown in FIG. 1.

FIG. 5 is a schematic representation of the screen of display device 14. As shown in FIG. 4, the screen has, for example, the capability of displaying 25 lines of characters where each line consists of 80-character column positions. In practice, one character position consists of a matrix of dot positions or picture elements referred to as pels. A typical character matrix for a display of the type represented by device 14 would be a matrix of six wide by ten high pels, which has been designated by the reference number 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The disk storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the disk. Data from the device 16 is supplied to the microprocessor 11 serial by byte from the addressed sector and storage tracks when requested.

It will be understood that all of the above described functions and interactions involving the microprocessor 11 are achieved through suitable programs which are also stored in memory 23 and which are called into operation in response to data from the keyboard 10 or interrupt signals generated by the various components of the system shown in FIG. 1.

A typical task which utilizes the present invention is now described with reference to FIGS. 1, 6, 7 and 8. In a preparatory step, a plurality of dictionaries of correctly spelled words are stored in the diskette storage device 16 representing each language that the system may be used to process. These dictionaries of words are stored and accessed in accordance with the technique described in U.S. Pat. No. 3,995,254, entitled "Digital Reference Matrix For Word Verification", Issued Nov. 30, 1976 to W. S. Rosenbaum and assigned to the present assignee. Each dictionary also includes the hyphenation points for the stored words in accordance with the teachings of U.S. Pat. No. 4,092,729, entitled "Apparatus For Automatically Forming Hyphenated Words", issued May 30, 1978 to W. S. Rosenbaum, et al and also assigned to the present assignee. These patents are hereby incorporated herein by reference for the purpose of teaching storing and accessing a dictionary memory for correct spellings and hyphenation points. Additionally, there is stored in the diskette storage menus corresponding to the present invention which enable the operator to enter control signals to the system to cause the system to selectively access one or more of the dictionary storage memories.

Figure 6:
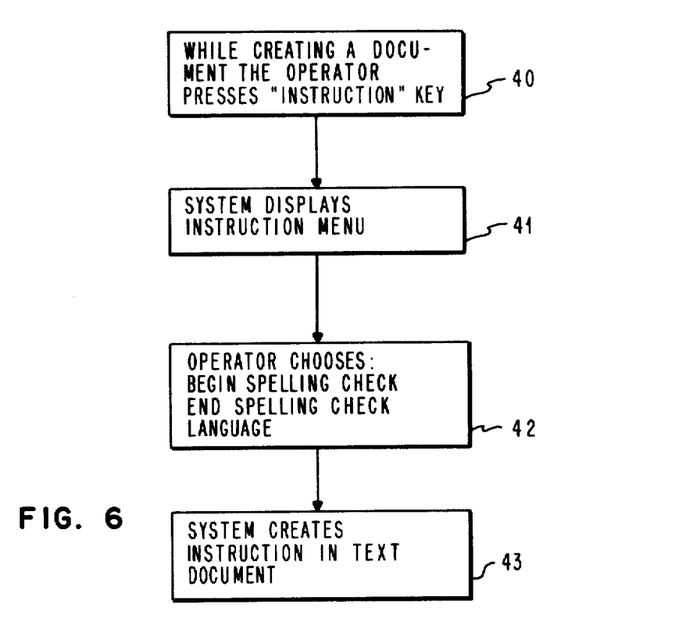
FIG. 6 is a logical flow diagram showing the functional operation of the present invention.
Figure 7:
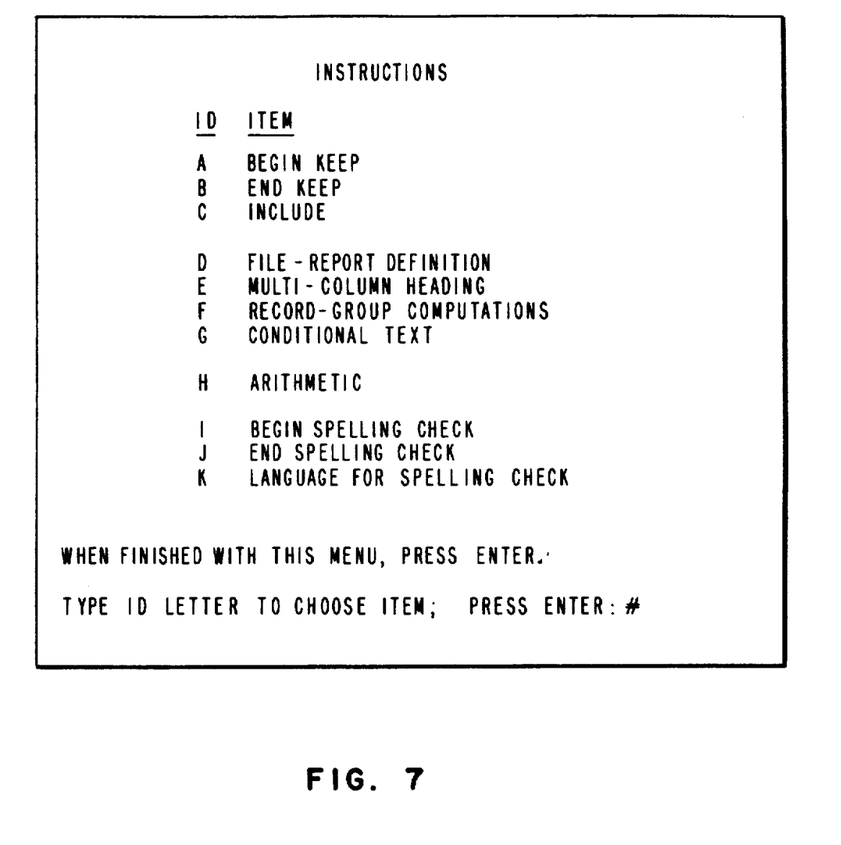
FIG. 7 illustrates operator selectable instructions as they would appear in the display device of FIG. 1 in accordance with the present invention.

The operator has the task of preparing a document which includes text sections from one or more languages. Referring to FIG. 6, block 40, as the operator keys the document an instruction key on the keyboard 10 may be depressed by the operator to cause the system to interrupt processing in block 41 and display to the operator the menu of possible command instructions shown in FIG. 7. The operator has the option to select from the menu shown in FIG. 7 as many of the instructions as are applicable to the job being performed. The operator selects each desired instruction by typing the appropriate identification letter from the lefthand column and pressing the "ENTER" key on the keyboard 10. Our focus here will be directed to instructions i, j, and k which are associated with the present invention. Instruction i when selected by the operator causes the system to insert in text at the present operating point an instruction which will subsequently be interpreted as discussed in further detail below to indicate the point where spelling verification will begin in the text. Instruction j when selected will cause the system to enter a code in text indicating that spelling check should be discontinued at the point where this code is encountered. Instructions i and j are used to suspend the spelling check routine to skip over data that the operator does not desire to have checked for incorrect spelling such as numerical tables.

Figure 8:
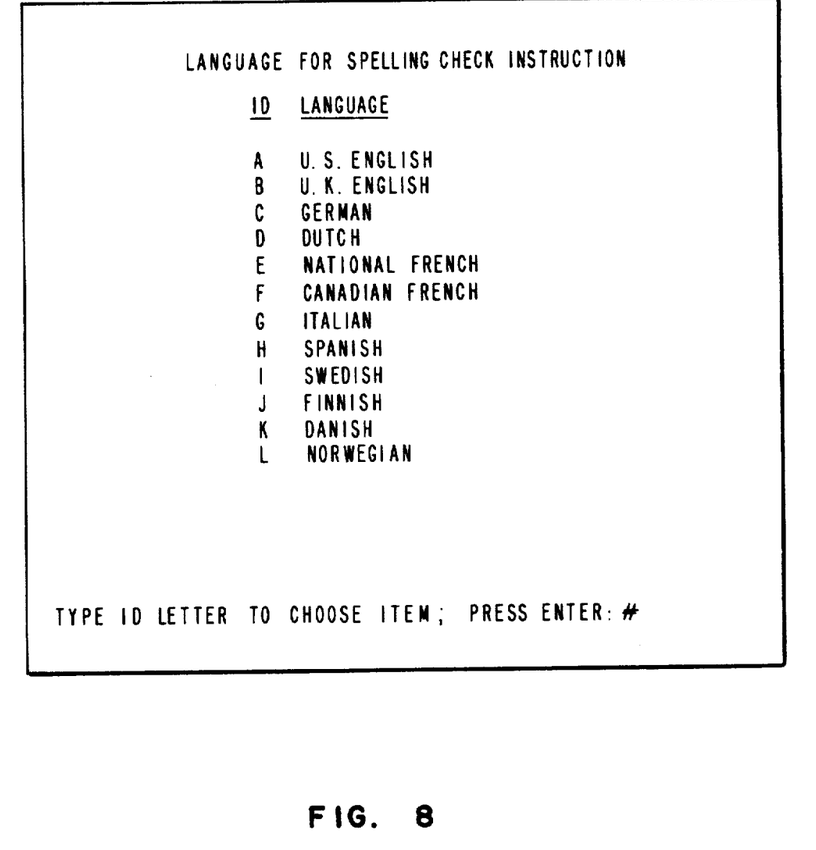
FIG. 8 illustrates spelling language instructions as they would appear in the display device of FIG. 1 in accordance with the present invention.

When instruction k is entered, it will be interpreted by the microprocessor as requiring the menu of FIG. 8 to be displayed. The menu of FIG. 8 displays to the operator the different languages for which dictionaries are stored in the disk storage device 16 and the corresponding identification codes for each language. The list of languages shown in FIG. 8 is exemplary only and not intended to be all inclusive. The operator selects the proper language identification code for each block of text keyed. The system inserts a language control instruction in the text data stream at the point where the operator keys the code. These instructions are stored in the text document in block 43 of FIG. 6 and control the system to access the proper dictionary during the spelling check operation. The spelling check routine is generally executed following the entry of all of the text of the document. By allowing the operator to embed the spelling check dictionary definition codes within the text, the system is controlled to automatically switch back and forth between the dictionaries as is appropriate.

Figure 9:
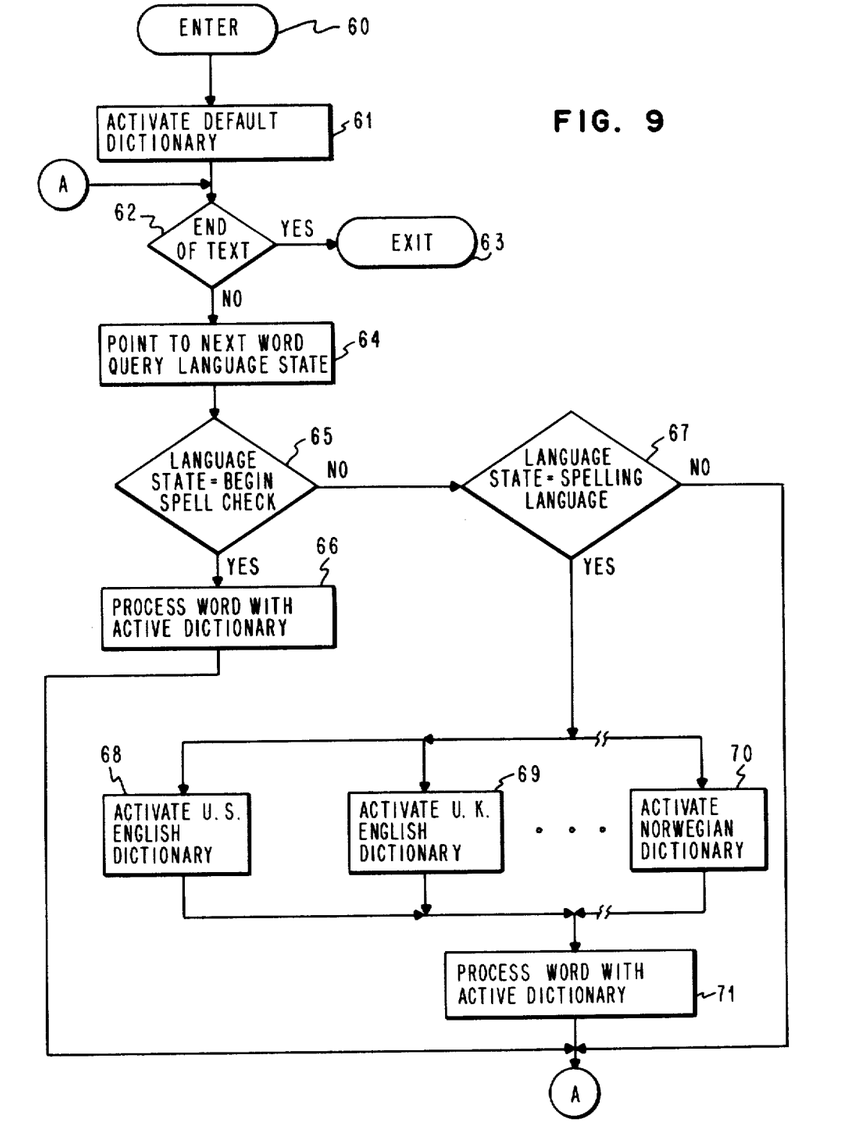
FIG. 9 illustrates a detailed flow operation of the present invention.

Referring now to FIG. 9 a flow diagram of the operation of the spell check routine is shown. In implementation, the routine is set up such that a default dictionary which corresponds to the native language of the country where the system will be used is activated automatically when the system is powered on. The routine is entered in block 60 and the default dictionary is activated in block 61. In block 62 a test is conducted on the text to determine whether the routine has reached the end of text. If it has the routine is exited in block 63 and ends. If not then in block 64 the next word of text is accessed. Also in block 64 the system is instructed to query the language state. The language state is an indicator which is set by the interpretation of one of the instruction codes i, j, or k in the data stream to indicate whether the system is to begin spell check, end spell check, or change the dictionary being used. In block 65 language state is tested to determine whether the begin spell check code is present. If the begin spell check code is present, then the word is checked against the active dictionary in block 66 and a branch is taken back to block 62 to continue processing.

Referring back to block 65, if the language state does not contain a begin spell check code then processing transfers to block 67 where language state is tested to determine if a spelling language code is present. If no spelling language code is present and no begin spell check code was present then the system assumes that the code present was an end spell check code and a branch is taken back to block 62 to continue processing without comparing the present word to any spelling dictionary. However, if in block 67 language state equals a spelling language then a branch is taken to block 68, 69, or 70 to activate the appropriate dictionary. In block 71 the word is checked against the activated dictionary and a branch is taken back to block 62 to continue processing. Checking the word against the activated dictionary may provide an indication of whether the word is spelled corretly or provide the hyphenation points for the word in accordance with the teachings of the afore-mentioned U.S. Pat. Nos. 3,995,254 and 4,092,729. Table 1 shows a program listing in pseudo code for carrying out the operation of the invention described in FIG. 9. The application and use of pseudo code is described in "An Introduction To Programming", (A Structural Approach Using PL/1 and PL/C-7), Second Edition, by Richard Conway and David Gries, Winthrop Publishers, Cambridge, Mass., Copyright 1975.

TABLE 1

ACTIVATE DICTIONARY FROM SYSTEM DEFAULT
WHILE NOT END OF TEXT DO
BEGIN
POINT TO NEXT ENTITY (WORD)
QUERY "LANGUAGE STATE"
IF LANGUAGE STATE = "BEGIN SPELLING CHECK"
THEN PROCESS THE WORD, USING THE
ACTIVE DICTIONARY ELSE
BEGIN
IF LANGUAGE STATE = "SPELLING LANGUAGE"
THEN BEGIN
CASE LANGUAGE OF
U.S. ENGLISH: ACTIVATE U.S. ENGLISH

TABLE 1-continued

DICTIONARY
U.K. ENGLISH: ACTIVATE U.K. ENGLISH
DICTIONARY
GERMAN: ACTIVATE GERMAN
DICTIONARY
NORWEGIAN : ACTIVATE NORWEGIAN
DICTIONARY
END
PROCESS THE WORD, USING THE ACTIVE
DICTIONARY
END
END
END
END
END

Although one embodiment of the invention has been illustrated in the accompanying drawing and described in the foregoing detailed description, it will be understood that the invention is not limited to the embodiment disclosed, but is capable of numerous rearrangements, modifications and substitutions without departing from the scope of the invention.

We claim:

1. An interactive information processing system for detecting erroneous data codes in a stream of data codes comprising:

a processor;

means connected to said processor for storing a plurality of lists of valid data codes of different languages;

means for inserting control signals in said stream of data codes, each control signal being indicative of the language of the data codes following said control signals;

a control program for operating said processor, said control program including, means operating said processor for detecting said control signals and activating the list of valid data codes of the language indicated by each said control signal;

means operating said processor for comparing the data codes in said stream following each said control signal with said activated list of valid data codes; and means operating said processor for outputting an indication when the compare is unequal.

2. An interactive information processing system for providing hyphenation points in data codes in a stream of data codes comprising:

a processor;

means connected to said processor for storing a plurality of lists of valid data codes of different languages including valid hyphenation points for said data codes;

means for inserting control signals in said stream of data codes, each control signal indicative of the language of the data codes following said control signal;

a control program for operating said processor, said control program including, means operating said processor for detecting said control signals and activating the list of valid data codes of the language indicated by each said control signal;

means operating said processor for comparing the data codes in said stream following each said control signal with said activated list of valid data codes; and means operating said processor for outputting said hyphenation points for said data codes when said compare is equal.

3. The system of claim 1 or claim 2 wherein said means for inserting further includes means for inserting in said stream of data codes a control signal for suspending operation of said processor for comparing.

4. The system of claim 3 wherein said means for inserting further includes means for inserting in said stream of data codes a control signal for resuming operation of said processor for comparing.

5. In an interactive information processing system an improved method for detecting erroneous data codes in a stream of data codes comprising the steps of:
(a) storing a plurality of lists of valid data codes of different languages;
(b) inserting in said stream of data codes control signals, each said control signal indicative of the language of the data codes following said control signal;
(c) detecting said control signals and activating the list of valid data codes of the language indicated by each said control signal;
(d) comparing the data codes in said stream following each said control signal with said activated list of valid data codes; and
(e) outputting an indication when the compare is unequal.

6. In an interactive information processing system an improved method for providing hyphenation points in data codes in a stream of data codes comprising the steps of:
(a) storing a plurality of lists of valid data codes of different languages including valid hyphenation points for said data codes;
(b) inserting control signals in said stream of data codes, each control signal indicative of the language of the data codes following said control signal;
(c) detecting said control signals and activating the list of valid data codes of the language indicated by each said control signal;
(d) comparing the data codes in said stream following each said control signal with said activated list of valid data codes; and
(e) outputting said hyphenation points for said data codes when said compare is equal.

7. The improved method of claim 5 or claim 6 further including the step of inserting in said stream of data codes a control signal for suspending said step of comparing.

8. The improved method of claim 7 further including the step of inserting in said stream of data codes a control signal for resuming said step of comparing.

* * * * *